R. M. MUSGROVE.
SHOCK ABSORBING BODY BRACE FOR AUTOMOBILES.
APPLICATION FILED APR. 5, 1916.

1,222,445. Patented Apr. 10, 1917.

WITNESSES

INVENTOR
Roy M. Musgrove
BY
ATTORNEYS

UNITED STATES PATENT OFFICE.

ROY MERL MUSGROVE, OF SPANISH FORK, UTAH, ASSIGNOR OF ONE-HALF TO E. D. CRUISE, OF KANSAS CITY, KANSAS.

SHOCK-ABSORBING BODY-BRACE FOR AUTOMOBILES.

1,222,445.  Specification of Letters Patent.  Patented Apr. 10, 1917.

Application filed April 5, 1916. Serial No. 89,030.

*To all whom it may concern:*

Be it known that I, ROY M. MUSGROVE, a citizen of the United States, and a resident of Spanish Fork, in the county and State of Utah, have invented a new and Improved Shock-Absorbing Body-Brace for Automobiles, of which the following is a full, clear, and exact description.

The general object of my invention is to provide an attachment for automobiles, particularly the Ford automobile, to firmly brace and sustain the body thereof, at the center, whereby to absorb and relieve the body, including the running boards, of strain and jars due to the vibrations and sagging of the body and running boards at the center.

A more particular object of the invention is to provide an attachment of the indicated character of simple form that may be readily hung on the chassis or frame bars and firmly engage the running boards at the approximate centers thereof and thus properly brace the said running boards and through the same brace the body.

Reference is to be had to the accompanying drawings forming a part of this specification in which similar reference characters indicate corresponding parts in all the views.

Figure 1:
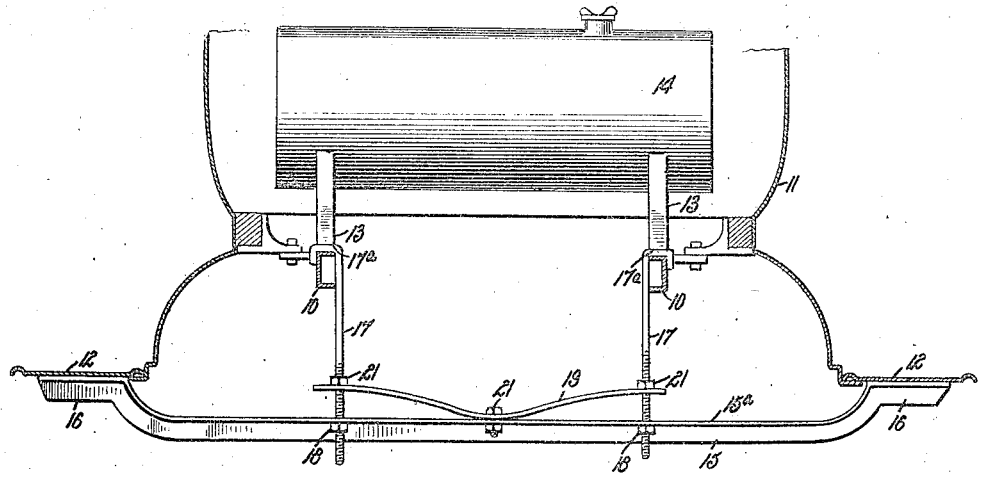
Figure 1 is a cross sectional view taken approximately along the transverse center of an automobile, showing my attachment in position.
Figure 2:
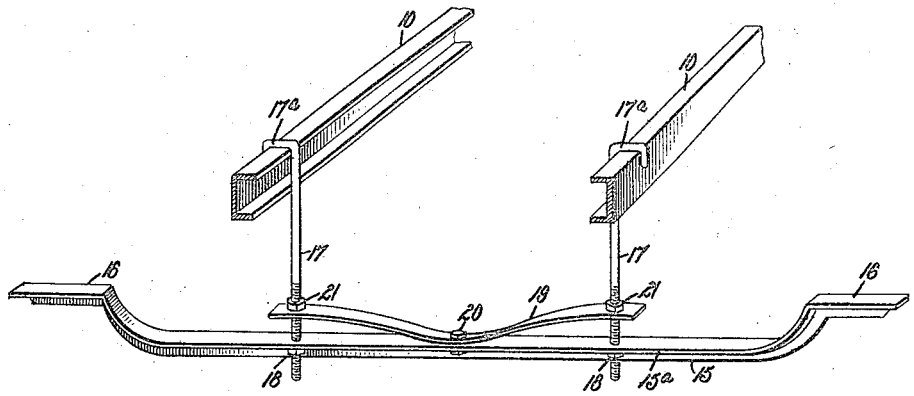
Fig. 2 is a perspective view of said attachment and including fragments of the chassis of the automobile.

In the illustration, the numeral 10 indicates the chassis of an automobile, the numeral 11, the body thereof, 12, the running boards, and 13 indicates the brackets sustaining the fuel tank 14.

My attachment includes a bar 15 adapted to range transversely at the approximate center of a vehicle and having offset ends 16 extending upwardly to come to a bearing against the under sides of the running boards 12.

To support the bar 15, hanger rods 17 are provided having hooked upper ends 17ª, adapted to be hooked over the frame bars 10 of the car at the center of the said bars or adjacent to the usual brackets 13, for the tank 14. The lower ends of the hanger rods 17 extend through vertical holes in the bar 15 at each side of the center thereof and said hangers are threaded to receive nuts 18, which are turned up against the flanges 15ª of said bar until the upwardly disposed offset ends 16 firmly contact with the running boards 12.

The hangers 17 are readily applied by a workman under the car, the center portion of the Ford car being open between the frame bars as is well understood, so that the engagement of the hangers 17 can be quickly effected.

A strap brace 19 is secured at its center to the center of the bar 15 by a bolt 21 or other suitable means. The ends of said strap 19 are formed with vertical holes for the passage of the hangers 17 therethrough and nuts 21 are provided on the said hanger rods above the brace 19 and adapted to be screwed down on the said rods to bear firmly against the said brace. The brace 19 thus gives additional support to the bar 15.

When my attachment is in place, the running boards and body are firmly sustained at the center, thereby preventing vibrations and sagging of the body and running boards, and preventing all strains thereon as well as doing away with the rattling of the running boards, doors, and mud guards. The attachment absorbs the strains and distributes the shocks so that the life of the car is materially extended as I find in practice.

Having thus described my invention I claim as new, and desire to secure by Letters Patent:—

1. The herein described attachment for automobiles including a bar adapted to be positioned beneath the body of an automobile and of a length to engage at its ends with the under sides of the running boards of the automobile, hanger rods supporting said bar and formed with means to connect the hangers with the frame of an automobile, the lower ends of said rods being threaded, and nuts on the threaded ends of the rods beneath the said bar, a brace above the bar and secured at its center thereto, the ends of the brace having holes through which the said hangers extend, and nuts on the hangers above the said brace.

2. The herein described attachment for automobiles, the same including hangers having means at the upper ends thereof to suspend the same from the frame of an automobile, a transverse pressure bar carried by the hangers, said bar being of a length to extend laterally beneath the running boards of the automobile to exert pressure thereon, a transverse element secured between its ends to the said pressure bar, the said ends being above and spaced from the pressure bar, the said hangers extending through the said ends, and means to vary the distance between the ends of the transverse element and the pressure bar.

In testimony whereof I have signed my name to this specification in the presence of two subscribing witnesses.

ROY MERL MUSGROVE.

Witnesses:
 JESSE ALLEN EARL,
 EDGAR DUDLEY CRUISE.